(12) United States Patent
Liu

(10) Patent No.: US 11,131,383 B2
(45) Date of Patent: Sep. 28, 2021

(54) ELECTRONIC CIGARETTE HAVING VENT HOLE FOR PREVENTING BLOCKAGE OF E-LIQUID CHANNEL

(71) Applicant: Tuanfang Liu, Shenzhen (CN)

(72) Inventor: Tuanfang Liu, Shenzhen (CN)

( * ) Notice: Subject to any disclaimer, the term of this patent is extended or adjusted under 35 U.S.C. 154(b) by 195 days.

(21) Appl. No.: 16/517,706

(22) Filed: Jul. 22, 2019

(65) Prior Publication Data
US 2020/0297036 A1  Sep. 24, 2020

(30) Foreign Application Priority Data
Mar. 20, 2019  (CN) .......................... 201910211664.5

(51) Int. Cl.
*F16J 15/10*  (2006.01)
(52) U.S. Cl.
CPC .................................. *F16J 15/102* (2013.01)
(58) Field of Classification Search
CPC ...... A24F 47/002; A24F 47/008; A24F 40/00; A24F 40/40; A24F 40/42; F16J 15/102
USPC ................................................. 131/328, 329
See application file for complete search history.

(56) References Cited

U.S. PATENT DOCUMENTS

2020/0297037 A1\*  9/2020  Liu .......................... A24F 1/32

\* cited by examiner

*Primary Examiner* — Hae Moon Hyeon
(74) *Attorney, Agent, or Firm* — Matthias Scholl P.C.; Matthias Scholl

(57) ABSTRACT

An electronic cigarette, including an atomization assembly and a battery assembly. The atomization assembly is disposed on the battery assembly. The atomization assembly includes a mouthpiece, a silica seal, a vapor guide tube, an e-liquid tank, a first ceramic silicone ring, a ceramic core, a second ceramic silicone ring, a heating tube, a first seal ring, a second seal ring, a base, a silica insulator, and a joint. The battery assembly includes a pneumatic switch, a silica gel sealing the pneumatic switch, a control plate, a casing, a plurality of screws, a support, a battery core, a first bolt, a second bolt, a transparent screen, and a pedestal. The vapor guide tube is disposed in the e-liquid tank. The first seal ring and the second seal ring are disposed on two ends of the base, respectively. The battery core is fixed on the control plate.

4 Claims, 5 Drawing Sheets

ELECTRONIC CIGARETTE HAVING VENT HOLE FOR PREVENTING BLOCKAGE OF E-LIQUID CHANNEL

CROSS-REFERENCE TO RELATED APPLICATIONS

Pursuant to 35 U.S.C. § 119 and the Paris Convention Treaty, this application claims foreign priority to Chinese Patent Application No. 201910211664.5 filed Mar. 20, 2019, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to an electronic cigarette. An electronic cigarette or e-cigarette is a handheld battery-powered vaporizer that simulates smoking by providing some of the behavioral aspects of smoking, including the hand-to-mouth action of smoking, but without burning tobacco. Using an e-cigarette is known as "vaping" and the user is referred to as a "vaper." Instead of cigarette smoke, the user inhales an aerosol of atomized nicotine-containing e-liquid, commonly called vapor.

SUMMARY

The disclosure provides an electronic cigarette.

Provided is an electronic cigarette, comprising an atomization assembly and a battery assembly. The atomization assembly is disposed on the battery assembly. The atomization assembly comprises a mouthpiece, a silica seal, a vapor guide tube, an e-liquid tank, a first ceramic silicone ring, a ceramic core, a second ceramic silicone ring, a heating tube, a first seal ring, a second seal ring, a base, a silica insulator, and a joint. The vapor guide tube is disposed in the e-liquid tank; the first seal ring and the second seal ring are disposed on two ends of the base, respectively; the silica insulator is embedded in a bottom end of the base and the heating tube is disposed on the base; the first ceramic silicone ring is sheathed on a first end of the ceramic core oriented to the mouthpiece, and the second ceramic silicone ring is sheathed on a second end of the ceramic core oriented to the base; the ceramic core is sheathed on the heating tube and is disposed on the base; the joint is disposed in the silica insulator; the base is embedded in a bottom end of the e-liquid tank; the silica seal is disposed in the mouthpiece, and the mouthpiece is disposed on the e-liquid tank.

The battery assembly comprises a pneumatic switch, a silica gel sealing the pneumatic switch, a control plate, a casing, a plurality of screws, a support, a battery core, a first bolt, a second bolt, a transparent screen, and a pedestal. The battery core is fixed on the control plate; the control plate is disposed on the support and fixed by the plurality of screws; the control plate comprises a universal serial bus (USB) interface extending in the pedestal; the pedestal is connected to the support and is fixed by the second bolt; the support is disposed in the casing; the silica gel is disposed on one end of the casing oriented to the mouthpiece; the transparent screen is disposed on the pedestal; and the support is fixed on the casing through the first bolt.

The silica seal of the atomization assembly comprises a vent hole. During refilling, the e-liquid can directly penetrate into the ceramic core. In the process of penetration, the e-liquid will produce bubbles. The bubbles can release from the vent hole thus preventing the blockage of the e-liquid channel.

The heating tube is a hollow structure and communicates with the pneumatic switch on the control plate. During smoking, the thermal vapor flow can enter the heating tube to drive the pneumatic switch to work and heat the ceramic core, so that the e-liquid in the atomization assembly is heated to a free state, thus preventing the blockage of the conveying pipe by the condensed e-liquid.

The e-liquid tank comprises protruding points, and the casing of the battery assembly comprises an inner surface provided with concave points corresponding to the protruding points. The power is output from the output end of the control plate and transmitted to the positive and negative joints of the atomization assembly, so that the heating wire of the ceramic core forms a closed loop, and the atomizer starts to work.

Advantages of the electronic cigarette according to embodiments of the disclosure are summarized as follows:

1. The atomization assembly comprises a silica seal provided with a vent hole, so that the refilling of the e-liquid to the atomizer requires no extra pressure.

2. The atomization assembly comprises a heating tube which can conduct heat and atomize the condensed e-liquid, thus preventing the blockage of the conveying pipe of the e-liquid.

DETAILED DESCRIPTIONS

To further illustrate, embodiments detailing an electronic cigarette are described below. It should be noted that the following embodiments are intended to describe and not to limit the disclosure.

Figure 1:
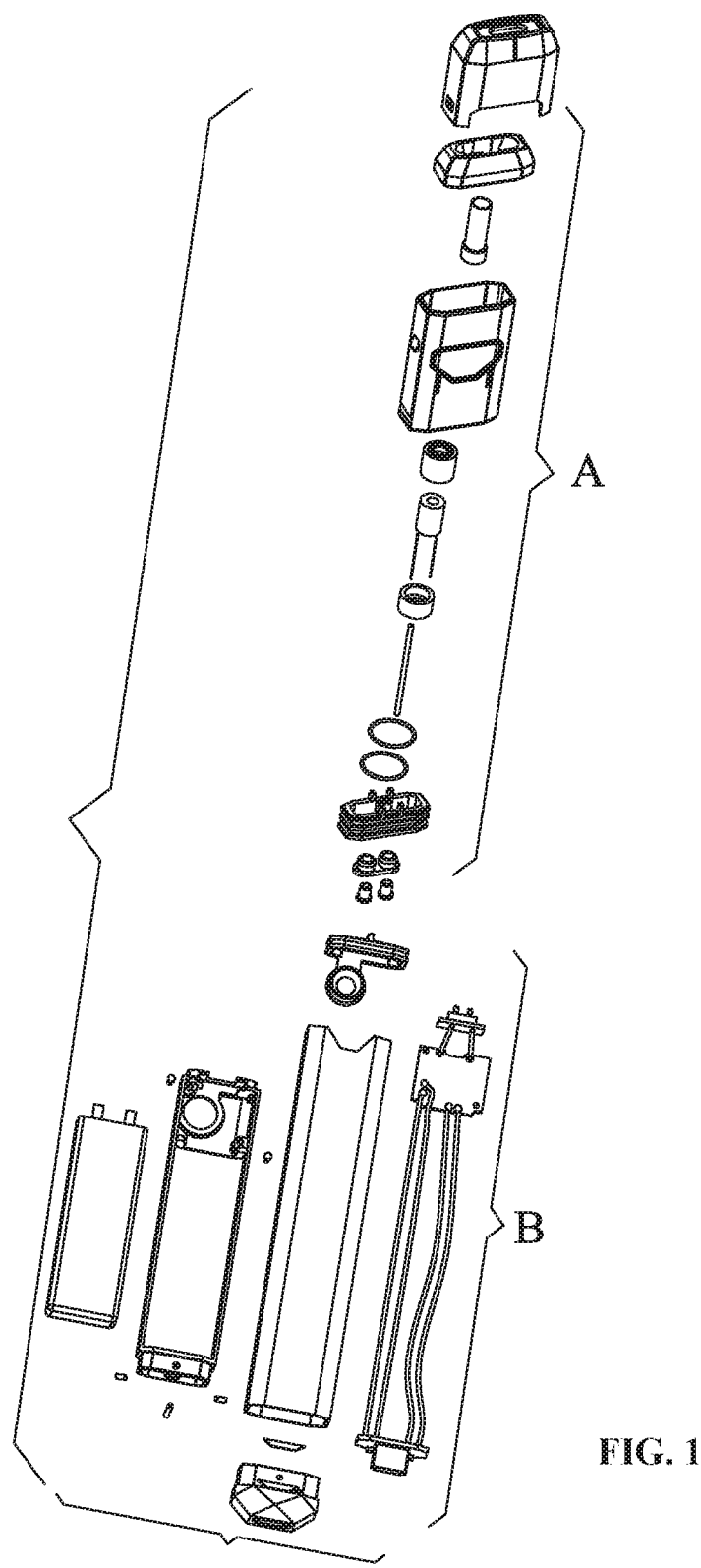
FIG. 1 is a schematic view of an electronic cigarette according to one embodiment of the disclosure.
Figure 2:
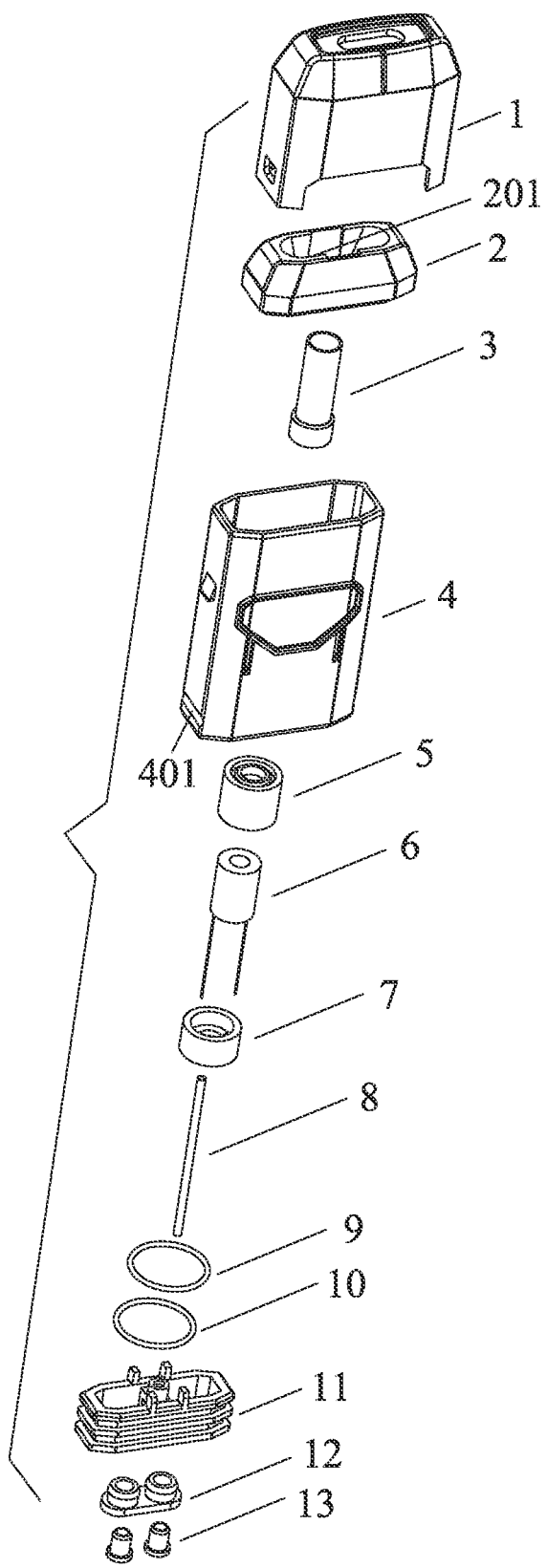
FIG. 2 is an exploded view of an atomization assembly of an electronic cigarette according to one embodiment of the disclosure.
Figure 3:
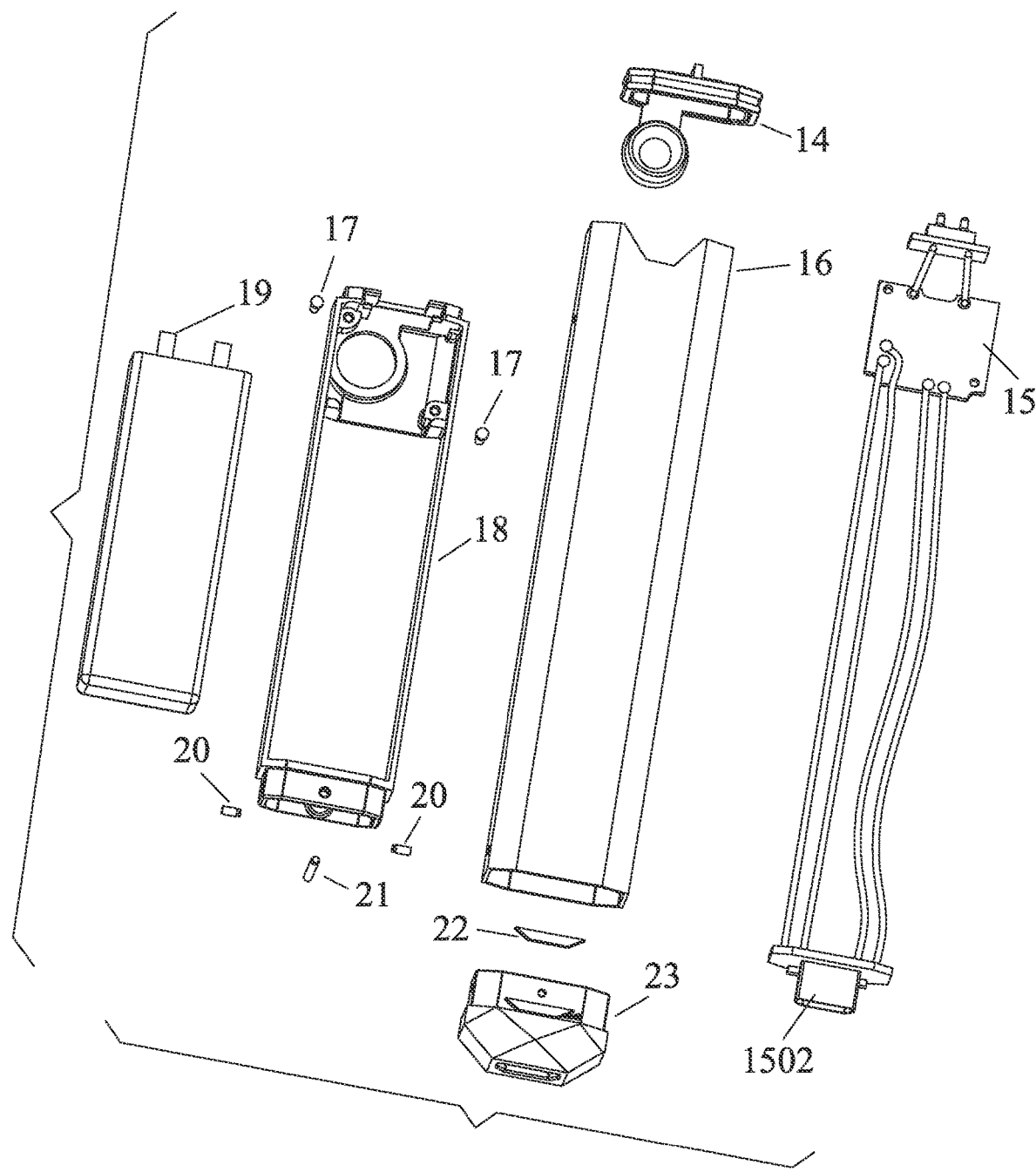
FIG. 3 is an exploded view of a battery assembly of an electronic cigarette according to one embodiment of the disclosure.
Figure 4:
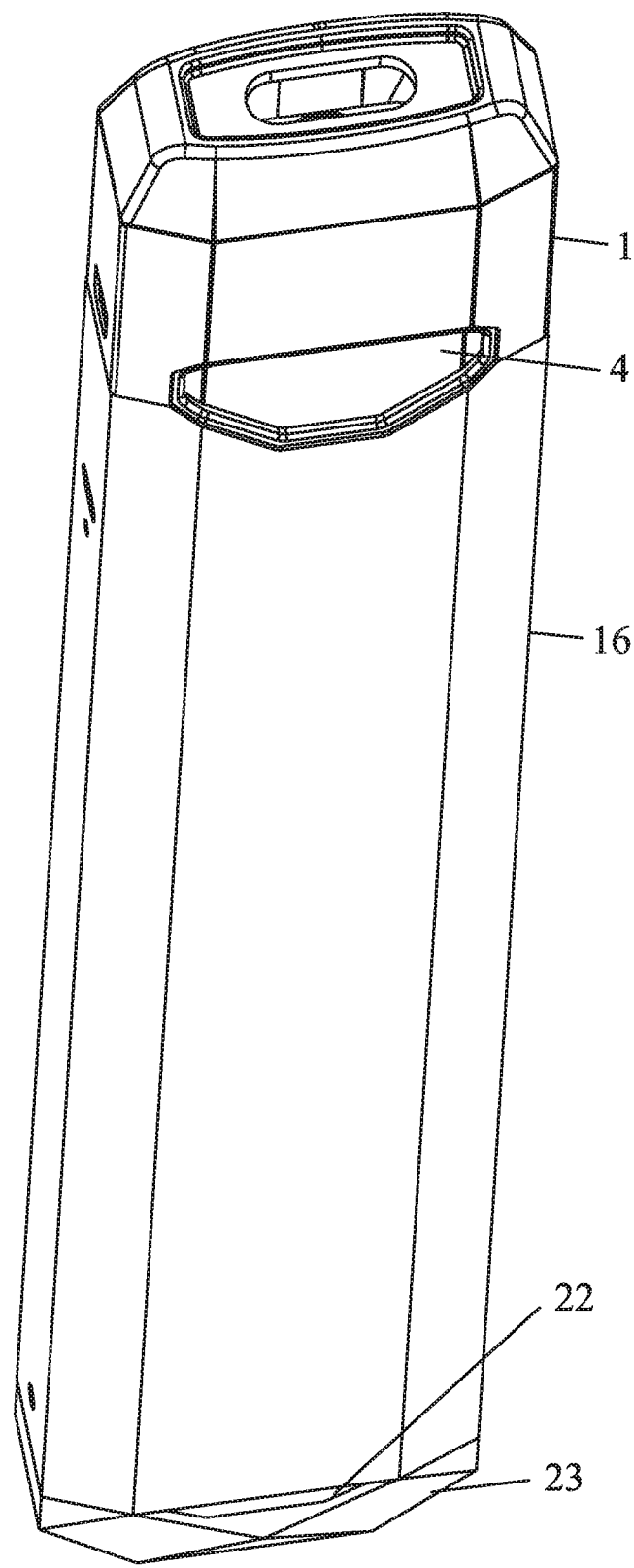
FIG. 4 is a stereogram of an electronic cigarette according to one embodiment of the disclosure.
Figure 5:
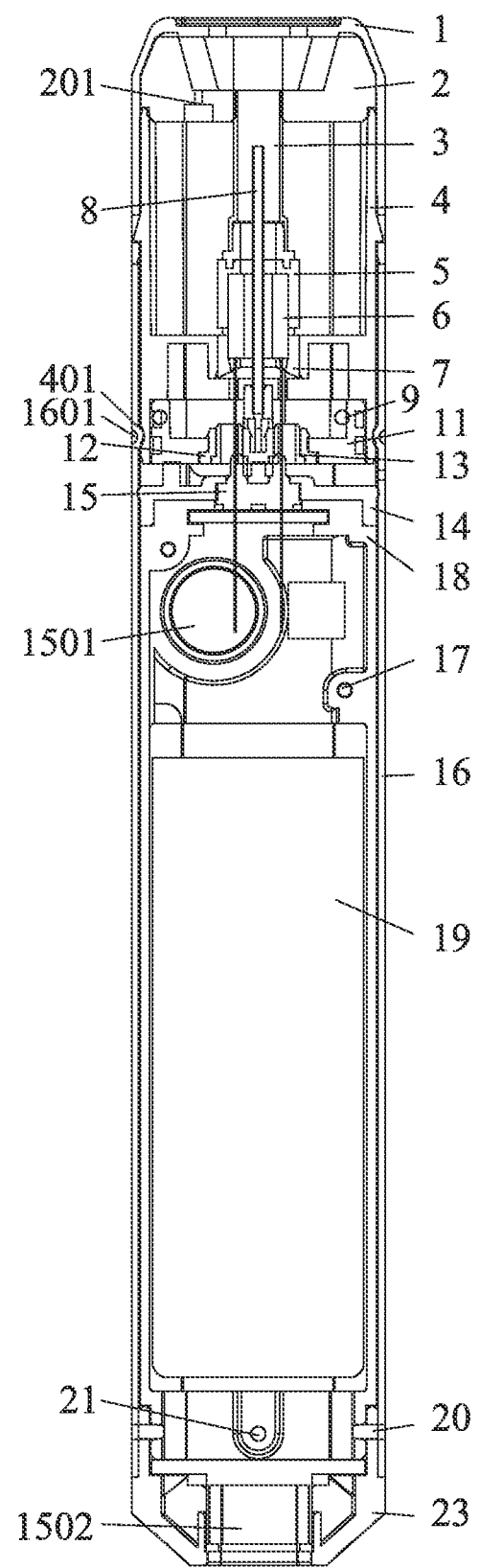
FIG. 5 is a sectional view of an electronic cigarette according to one embodiment of the disclosure.

As shown in FIGS. 1-5, the disclosure provides an electronic cigarette comprising an atomization assembly A and a battery assembly B. The atomization assembly A comprises a mouthpiece 1, a silica seal 2, a vapor guide tube 3, an e-liquid tank 4, a first ceramic silicone ring 5, a ceramic core 6, a second ceramic silicone ring 7, a heating tube 8, a first seal ring 9, a second seal ring 10, a base 11, a silica insulator 12, and a joint 13. The vapor guide tube 3 is disposed in the e-liquid tank 4; the first seal ring 9 and the second seal ring 10 are disposed on two ends of the base 11, respectively; the silica insulator 12 is embedded in a bottom end of the base 11 and the heating tube 8 is disposed on the base 11; the first ceramic silicone ring 5 is sheathed on a first end of the ceramic core 6 oriented to the mouthpiece, and the second ceramic silicone ring 7 is sheathed on a second end of the ceramic core 6 oriented to the base; the ceramic core 6 is sheathed on the heating tube 8 and is disposed on the base 11; the joint 13 is disposed in the silica insulator 12; the base 11 is embedded in a bottom end of the e-liquid tank 4; the silica seal 2 is disposed in the mouthpiece 1, and the mouthpiece 1 is disposed on the e-liquid tank 4.

The top of the silica seal 2 of the atomization assembly comprises a vent hole. During refilling, the e-liquid can directly penetrate into the ceramic core 6. In the process of penetration, the e-liquid will produce bubbles. The bubbles can release from the vent hole thus preventing the blockage of the e-liquid channel. The heating tube 8 is a hollow structure and communicates with the pneumatic switch on the control plate 15. During smoking, the thermal vapor flow can enter the heating tube 8 to drive the pneumatic switch to work and heat the ceramic core, so that the e-liquid in the atomization assembly is heated to a free state, thus preventing the blockage of the conveying pipe by the condensed e-liquid.

The battery assembly B comprises a pneumatic switch 1501, a silica gel 14 sealing the pneumatic switch, a control plate 15, a casing 16, a plurality of screws 17, a support 18, a battery core 19, a first bolt 20, a second bolt 21, a transparent screen 22, and a pedestal 23. The battery core 19 is fixed on the control plate 15; the control plate 15 is disposed on the support 18 and fixed by the plurality of screws 17; the control plate 15 comprises a USB interface 1502 extending in the pedestal 23; the pedestal 23 is connected to the support 18 and is fixed by the second bolt 21; the support 18 is disposed in the casing 16; the silica gel 14 is disposed on one end of the casing 16 oriented to the mouthpiece; the transparent screen 22 is disposed on the pedestal 23; and the support 18 is fixed on the casing through the first blot 20. The e-liquid tank 4 comprises protruding points 401, and the casing 16 of the battery assembly comprises an inner surface provided with concave points 1601 corresponding to the protruding points. The power is output from the output end of the control plate 15 and transmitted to the positive and negative joints of the atomization assembly, so that the heating wire of the ceramic core 7 forms a closed loop, and the atomizer starts to work. The electronic cigarette is a flat, rectangular structure, and is compact and easy to carry.

It will be obvious to those skilled in the art that changes and modifications may be made, and therefore, the aim in the appended claims is to cover all such changes and modifications.

What is claimed is:

1. An electronic cigarette, comprising:
    an atomization assembly, the atomization assembly comprising a mouthpiece, a silica seal, a vapor guide tube, an e-liquid tank, a first ceramic silicone ring, a ceramic core, a second ceramic silicone ring, a heating tube, a first seal ring, a second seal ring, a base, a silica insulator, and a joint; and
    a battery assembly, the battery assembly comprising a pneumatic switch, a silica gel, a control plate, a casing, a plurality of screws, a support, a battery core, a first bolt, a second bolt, a transparent screen, and a pedestal;
    wherein:
    the atomization assembly is disposed on the battery assembly;
    the vapor guide tube is disposed in the e-liquid tank; the first seal ring and the second seal ring are disposed on two ends of the base, respectively; the silica insulator is embedded in a bottom end of the base and the heating tube is disposed on the base; the first ceramic silicone ring is sheathed on a first end of the ceramic core oriented to the mouthpiece, and the second ceramic silicone ring is sheathed on a second end of the ceramic core oriented to the base; the ceramic core is sheathed on the heating tube and is disposed on the base; the joint is disposed in the silica insulator; the base is embedded in a bottom end of the e-liquid tank; the silica seal is disposed in the mouthpiece, and the mouthpiece is disposed on the e-liquid tank; and
    the battery core is fixed on the control plate; the pneumatic switch is disposed on the control plate; the control plate is disposed on the support and fixed by the plurality of screws; the control plate comprises a universal serial bus (USB) interface extending in the pedestal; the pedestal is connected to the support and is fixed by the second bolt; the support is disposed in the casing; the silica gel is disposed on one end of the casing oriented to the mouthpiece; the transparent screen is disposed on the pedestal; and the support is fixed on the casing through the first blot.

2. The electronic cigarette of claim 1, wherein a top of the silica seal comprises a vent hole.

3. The electronic cigarette of claim 1, wherein the heating tube is a hollow structure and communicates with the pneumatic switch on the control plate.

4. The electronic cigarette of claim 1, wherein the e-liquid tank comprises protruding points, and the casing of the battery assembly comprises an inner surface provided with concave points corresponding to the protruding points.

* * * * *